No. 706,519. Patented Aug. 12, 1902.
P. BOYD.
METHOD OF WELDING AND TAPERING SOCKETS.
(Application filed Dec. 21, 1901.)
(No Model.) 3 Sheets—Sheet 1.
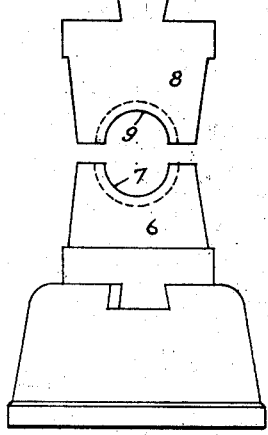
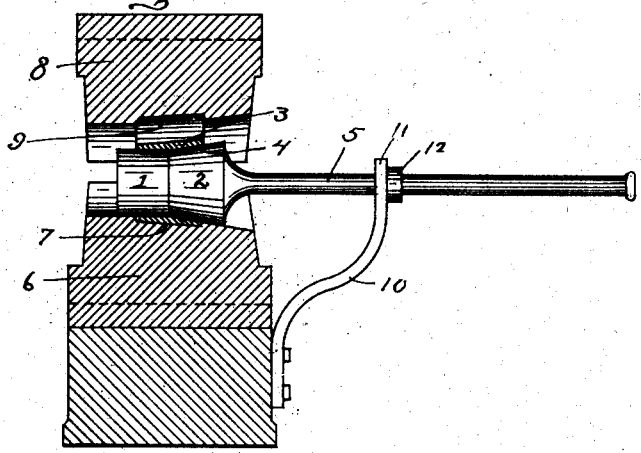
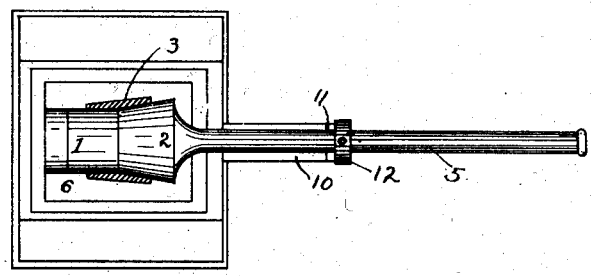
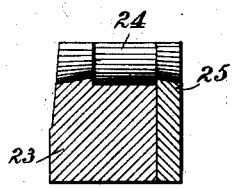
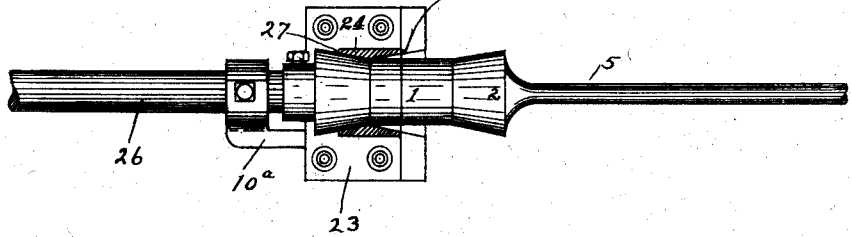
Witnesses.
Fred O. Sweet
Walter Tamariss
Inventor.
Peter Boyd
By Kay & Totten
Attorneys.

No. 706,519. Patented Aug. 12, 1902.
P. BOYD.
METHOD OF WELDING AND TAPERING SOCKETS.
(Application filed Dec. 21, 1901.)
(No Model.) 3 Sheets—Sheet 2.
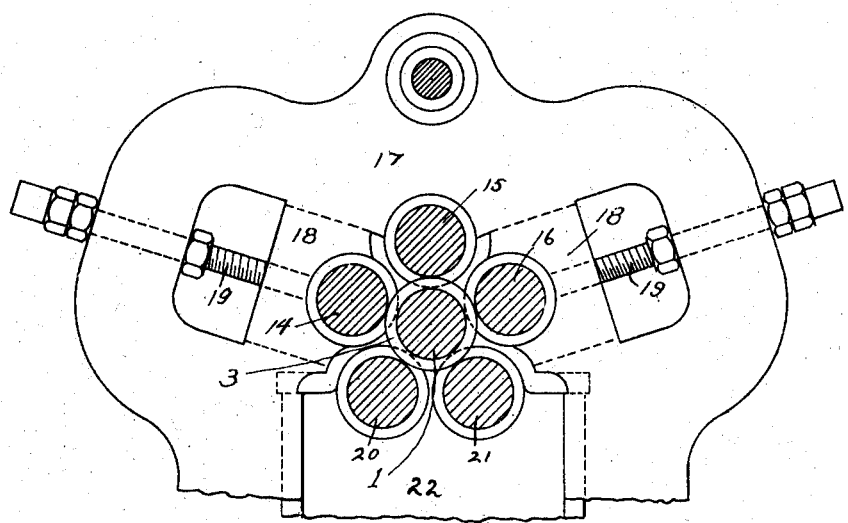
Fig. 5
Fig. 6
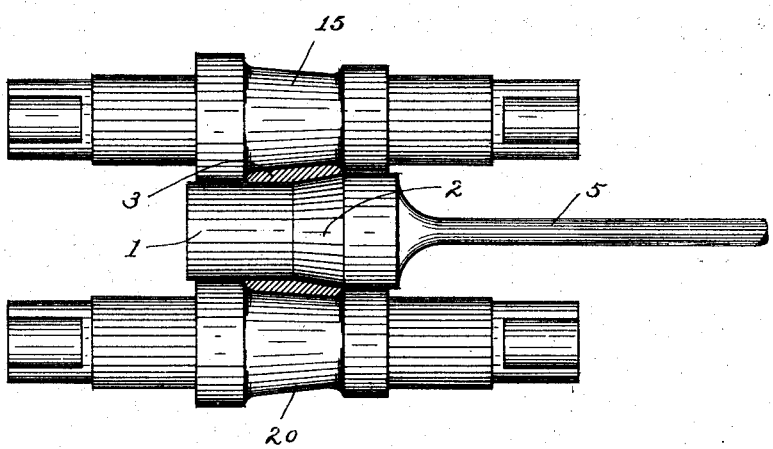
Witnesses. Inventor:

No. 706,519. Patented Aug. 12, 1902.
P. BOYD.
METHOD OF WELDING AND TAPERING SOCKETS.
(Application filed Dec. 21, 1901.)
(No Model.) 3 Sheets—Sheet 3.
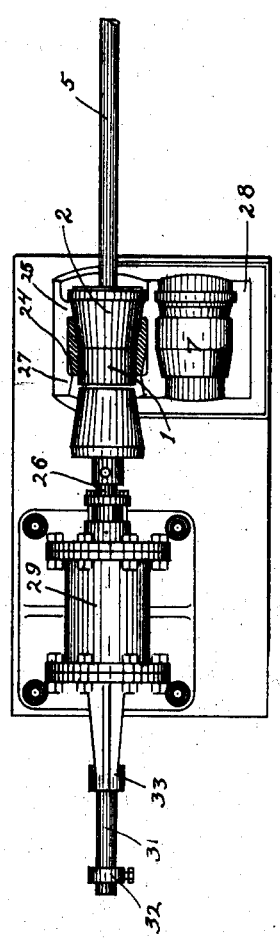
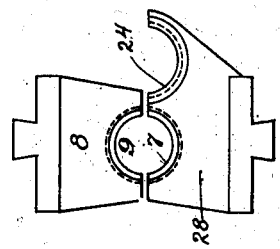
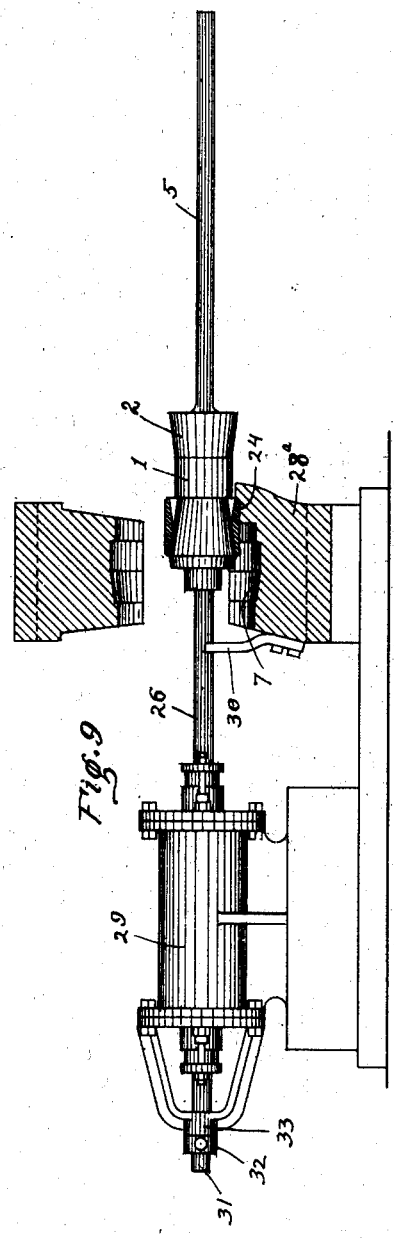
Witnesses.
Inventor.
Peter Boyd
By Kay & Totten
Attorneys.

UNITED STATES PATENT OFFICE.

PETER BOYD, OF PITTSBURG, PENNSYLVANIA, ASSIGNOR TO NATIONAL TUBE COMPANY, OF PITTSBURG, PENNSYLVANIA, A CORPORATION OF NEW JERSEY.

METHOD OF WELDING AND TAPERING SOCKETS.

SPECIFICATION forming part of Letters Patent No. 706,519, dated August 12, 1902.

Application filed December 21, 1901. Serial No. 86,767. (No model.)

*To all whom it may concern:*

Be it known that I, PETER BOYD, a resident of Pittsburg, in the county of Allegheny and State of Pennsylvania, have invented a new and useful Improvement in Methods of Welding and Tapering Sockets; and I do hereby declare the following to be a full, clear, and exact description thereof.

My invention relates to a method of welding, shaping, and tapering pipe couplings or sockets; and its object is to provide a method whereby couplings or sockets can be welded, shaped, and tapered internally at both ends at a single heat and with a minimum of operations and handlings.

Pipe couplings or sockets are preferably tapered at both ends, where the screw-threads are cut so that when they are screwed onto a pipe they will form a tight joint therewith. Heretofore it has been the practice to weld and shape such couplings upon a straight mandrel, then strip the same off said mandrel, and after the coupling had cooled taper the same internally at both ends by means of a suitably-shaped reaming or tapping tool. It has also been proposed to weld and shape the couplings upon a straight mandrel, as above described, then strip the same off said mandrel, and at the same heat by means of suitable apparatus or dies forge or expand the ends of the couplings to produce the internal taper. In all methods of manufacture prior to my invention, however, at least three steps or operations were necessary before the coupling was ready for threading—namely, first, welding and shaping on a straight mandrel; second, stripping the welded and shaped coupling off the mandrel, and, third, at either the same heat forging or expanding the ends of the coupling to form the internal taper or after the coupling had cooled reaming out the same internally at both ends. Each additional step or operation in the manufacture of small articles of this character necessitates an additional handling thereof and adds considerably to the cost; but heretofore it has never been found practical to make such couplings with a less number of steps than those enumerated.

It is the object of my invention to provide a method of welding and shaping couplings or sockets and tapering the same internally at both ends whereby the number of steps or operations and handlings are reduced and the cost correspondingly reduced.

To this end my invention consists in welding and shaping the coupling and simultaneously tapering the same internally at one end and then at the same heat expanding and tapering the same internally at the opposite end.

My invention also comprises the welding and shaping of the coupling on a suitable mandrel having a straight and a tapered portion or at least a tapered portion, thereby tapering the coupling internally and preferably at one end only, and then stripping said coupling from said mandrel by means of a plunger or pusher having a tapered portion which expands and tapers the coupling internally at its opposite end.

In the accompanying drawings, Figure 1 is a longitudinal section of suitable dies and a mandrel for carrying into effect the first step of the method. Fig. 2 is an end view of the dies. Fig. 3 is a plan view of the bottom or anvil die. Fig. 4 is a plan view of suitable apparatus for carrying into effect the second step of the method. Fig. 4ª is a longitudinal section of the same. Fig. 5 is a transverse section, and Fig. 6 a longitudinal section, of rolls suitable for carrying into effect the first step of the method. Figs. 7 and 8 are respectively plan and end views of apparatus suitable for carrying into effect both steps of the method, and Fig. 9 is a longitudinal section of a modified form of apparatus.

The first step of the operation consists in welding and shaping the coupling and simultaneously tapering the same internally and preferably at one end only. Various forms of apparatus may be employed for this purpose; but I prefer with all forms of such apparatus to employ a mandrel having the straight portion 1 and the tapered portion 2, or at least the tapered portion, over which the bent-up and heated blank 3 is slipped and on which it is welded, shaped, and tapered internally and preferably at one end only, as at 4. This mandrel may be used either in conjunction with a suitable die or dies, as shown in Figs. 1, 2, 3, 7, 8, and 9, or in conjunction with rolls, as shown in Figs. 5 and 6. The mandrel is preferably provided with a handle 5, whereby it can be rotated, as is necessary, within the dies and also whereby it can be conveniently handled and placed within the dies or rollers and thence carried to the stripping-die. The welding-die may be nothing but an ordinary anvil, and the blank may be welded and shaped on the mandrel by means of an ordinary hammer; but I prefer to use an anvil-die 6, having formed therein a suitable die-cavity 7 of such contour that the coupling will be given the proper external shape. With this die an ordinary hammer may be used; but I prefer to use with the same a swaging-tool or top die 8, which also is provided with a suitably-shaped cavity 9 for giving the proper external shape to the coupling. The bent-up heated blank is slipped upon the mandrel, so that it covers substantially equal portions of the straight and tapered faces of the mandrel, and said mandrel, with the blank thereon, is then placed between the dies, when by operating the top die by suitable means, such as a power-cylinder or the like, the blank will be welded, shaped externally, and tapered internally at one end. During this welding operation the mandrel will preferably be rotated by means of the handle 5. To insure the blank being in proper position on the mandrel while being welded, the latter must be in proper position with reference to the die-cavities in which the blank rests. It is desirable to use some stop or gage which will properly position the mandrel, and as a convenient means for this purpose I have shown an arm or bracket 10, secured to the anvil-die and provided at its upper end with a fork 11, which embraces the handle 5 of the mandrel. A collar 12 on the handle is adapted to abut against the fork 11 and properly positions the mandrel in the dies. Various other forms of stop or gage for this purpose may be used. With the apparatus shown in Figs. 5 and 6 the mandrel is placed in proper position between the cluster of rolls shown, and the heated blank by the rotation of the rolls is welded, shaped externally, and tapered internally on one end, as will be readily understood. Various forms of rolls for this purpose may be employed, and I have shown a form which is old in the art. It comprises a cluster of five rolls 14, the top rolls 14, 15, and 16 being mounted in suitable housings 17 and two of them—namely, the rolls 14 and 16—being adjustable toward and from the mandrel—as, for instance, by being mounted in suitable bearings 18, which are adjusted by the screws 19, as will be readily understood. The bottom rolls 20 and 21 are mounted in the upper end of a vertically-reciprocating slide 22, so that said rolls can be lowered to permit the removal of the mandrel with the welded blank thereon. All of the rolls of the cluster are suitably shaped to give the proper external shape to the coupling, and the heated blank can be slipped upon the mandrel in ring form and then introduced with the same into the rolls; but preferably it is fed in the form of a strip into the cluster of rolls and around the mandrel, as is the practice with machines of this character. The coupling having been welded and shaped on the mandrel either by the dies shown in Figs. 1, 2, and 3 or by the rolls shown in Figs. 5 and 6 or in any other suitable manner is ready for the second step of the operation, and for this it is carried on the mandrel to the stripping-die 23. (Shown in Fig. 4.) This die is provided on its upper face with a suitable cavity 24 for receiving the coupling and on one side with the abutments or shoulders 25, against which the internally-tapered end of the coupling bears, as shown. A suitable plunger 26 is then brought from the opposite side against the end of the mandrel and pushed forward to force the latter out of the coupling. This plunger is provided with a tapered head of such size that in its forward movement it will expand the remaining end of the coupling and taper the same internally, as shown. This plunger must be forced into the coupling to just the proper extent and no farther. Hence some means for limiting the forward movement thereof is preferably provided. In case said plunger is operated by power mechanism, such as a power-cylinder or a cam, this power mechanism will limit the forward movement of the plunger. In other cases a suitable stop, such as the arm 10$^a$, may be secured to the plunger in position to contact with the stripping-die 23 when the plunger has reached the limit of its necessary movement. The tapered head of the plunger will expand the rear end of the coupling out into the die-cavity 24, so that its end will lie in front of the shoulders or abutments 27, formed by the end wall of the cavity. These strip the coupling off the plunger 26 when the latter is withdrawn.

In Figs. 7, 8, and 9 I have shown forms of apparatus for welding and tapering sockets which are adapted to carry out both of the steps of the method. In said apparatus the mandrel above described is employed in combination with suitable dies and a power-plunger. The anvil-die is provided with a cavity in which the coupling is welded and shaped and a cavity in line with the plunger for stripping the coupling from the mandrel. In Figs. 7 and 8 these two cavities are side by side, while in Fig. 9 the stripping-cavity is slightly in front of and above the welding-cavity. In Figs. 7 and 8 the anvil-die 28 is provided with the welding and shaping cavity 7 and at one side thereof and in line with the plunger 26 with the stripping-cavity 24 and shoulders or abutments 25 and 27. A suitably-shaped top die 8 is used in conjunction with the welding-cavity 7. The plunger 26 is shown as operated by a hydraulic or other power cylinder 29. With this apparatus the coupling is welded and shaped on the mandrel in the cavity 7, and the mandrel, with the coupling thereupon, is then carried sidewise and dropped into the stripping-cavity 24, when the plunger 26 is projected to force the mandrel out of the coupling and to expand and taper the rear end thereof, the coupling being stripped off the plunger when the latter is withdrawn. In Fig. 9 the die 28ª is provided with the welding-cavity 7 and slightly above the same and in front thereof with the stripping-abutments 25, which are in line with the plunger 26. The latter is also actuated by a power-cylinder 29. With this form of die the coupling is welded and shaped on the mandrel in the cavity 7, and then said mandrel, with the coupling thereon, is slightly raised and drawn forward, so as to bring the end of the coupling against the shoulders 25. The plunger 26 is then projected to force the mandrel out of the coupling and expand and taper the rear end of the latter. As the stripping-cavity has no rear end walls, some other means must be provided for stripping the coupling off the plunger 26. As a convenient means for this purpose I have shown a fork 30, which embraces the plunger and is adapted to engage the rear end of the coupling and strip the same off the plunger as the latter is retracted. This fork may be secured to any convenient support, such as the anvil-die.

In the apparatus shown in Figs. 7 and 9 the forward movement of the plunger is limited by extending the piston-rod of the power-cylinder out through the rear head thereof, as at 31, and securing thereto a collar 32 or the like, which on its forward movement will strike against a yoke 33, secured to the cylinder, and thus stop the plunger.

I have shown the mandrel in all cases provided with a straight as well as a tapered portion; but it would be sufficient if it were tapered throughout. In that event the coupling would be tapered from end to end, and the plunger 26 when forced into the smaller end would have to expand the same to a greater extent than with the shape shown in the drawings. I prefer to use a mandrel with a straight as well as a tapered portion, but wish it understood that my invention is not limited thereto.

It will be observed that by following the steps and with the apparatus above described a coupling or socket can be welded, shaped, and tapered internally at both ends at a single heat and with only two steps or operations, thereby doing away at least with one handling of the coupling as compared with old methods.

What I claim as my invention, and desire to secure by Letters Patent, is—

1. The method of welding and tapering pipe couplings or sockets, which consists in heating the blank, welding the same on an internal support and simultaneously tapering it internally toward one end, and then removing the same from the internal support and simultaneously expanding the smaller end thereof and tapering it internally.

2. The method of welding and tapering pipe couplings or sockets, which consists in heating the blank, welding the same on a mandrel having a tapered portion, thereby simultaneously tapering the coupling internally toward one end, and then stripping the same from the mandrel and simultaneously expanding and tapering the other end thereof internally.

3. The method of welding and tapering pipe couplings or sockets, which consists in welding a blank on a mandrel having a straight and a tapered portion, said blank extending onto both of said portions, whereby the blank is welded and tapered internally at one end, then stripping the coupling from said mandrel and tapering the other end thereof internally.

4. The method of welding and tapering pipe couplings or sockets, which consists in welding a blank on a mandrel having a tapered portion, whereby the coupling is tapered internally toward one end, and then forcing the mandrel out of the coupling by a tapered plunger, thereby expanding the smaller end of the coupling and tapering the same internally.

5. The method of welding and tapering pipe couplings or sockets, which consists in welding a blank on a mandrel having a straight and a tapered portion, said blank extending onto both of said portions, whereby it is welded and tapered internally at one end, and then forcing the mandrel out of the coupling by a tapered plunger, thereby expanding the other end of the coupling and tapering the same internally.

In testimony whereof I, the said PETER BOYD, have hereunto set my hand.

PETER BOYD.

Witnesses:
ROBERT C. TOTTEN,
F. W. WINTER.